US008394469B2

(12) United States Patent
Takahashi (10) Patent No.: US 8,394,469 B2
(45) Date of Patent: *Mar. 12, 2013

(54) EXHAUST PIPE FOR INTERNAL COMBUSTION ENGINE (75) Inventor: Naohisa Takahashi, Shizuoka (JP)

(73) Assignee: Yamaha Hatsudoki Kabushiki Kaisha, Shizuoka (JP)

(*) Notice: Subject to any disclaimer, the term of this patent is extended or adjusted under 35 U.S.C. 154(b) by 511 days.

This patent is subject to a terminal disclaimer.

(21) Appl. No.: 11/177,088

(22) Filed: Jul. 8, 2005

(65) Prior Publication Data

US 2006/0010862 A1 Jan. 19, 2006

(30) Foreign Application Priority Data

Jul. 14, 2004 (JP) ................................ 2004-206904

(51) Int. Cl.
*B32B 9/00* (2006.01)
(52) U.S. Cl. ....... 428/34.6; 428/469; 428/472; 428/701; 428/702; 428/34.1; 428/34.4
(58) Field of Classification Search ............... 29/890.08, 29/527.3; 60/323, 272; 428/633, 212, 323, 428/408, 446, 697, 469, 472, 701, 702, 34.1, 428/34.4, 34.6; 427/248.1, 596, 398.1, 405, 427/453; 138/140, 141, 145
See application file for complete search history.

(56) References Cited

U.S. PATENT DOCUMENTS

| 4,975,314 A | * | 12/1990 | Yano et al. ..................... 428/213 |
| 5,718,046 A | * | 2/1998 | Wang ........................ 29/890.08 |
| 5,728,465 A | * | 3/1998 | Dorfman et al. ............... 428/408 |
| 6,413,589 B1 | * | 7/2002 | Li ................................ 427/376.6 |
| 2002/0090790 A1 | | 7/2002 | Huber et al. |
| 2002/0130033 A1 | | 9/2002 | Beitinger et al. |
| 2003/0089343 A1 | * | 5/2003 | Yamaguchi et al. .......... 123/495 |
| 2003/0091455 A1 | | 5/2003 | Mathew |
| 2003/0180571 A1 | | 9/2003 | Singh |

FOREIGN PATENT DOCUMENTS

| DE | 950 520 C | | 10/1956 |
| DE | 102 54 714 A1 | | 6/2004 |
| DE | 102 54 715 A1 | | 6/2004 |
| FR | 2 375 449 A | | 7/1978 |
| JP | 59-63317 A | | 4/1984 |
| JP | 59063317 | * | 4/1984 |
| JP | 02-13700 | | 4/1990 |
| JP | 03-249313 A | | 11/1991 |
| JP | 04-041660 A | | 2/1992 |
| JP | 06-228733 A | | 8/1994 |

(Continued)

OTHER PUBLICATIONS

Official communication issued in the counterpart Chinese Application No. 2005100841582, mailed on Mar. 9, 2007.
Takahashi: "Exhaust Pipe for Internal Combustion Engine, and Internal Combustion Engine and Transportation Apparatus Incorporating the Same," U.S. Appl. No. 11/470,098, filed Sep. 5, 2006.

(Continued)

*Primary Examiner* — Ellen S Wood
(74) *Attorney, Agent, or Firm* — Keating & Bennett, LLP (57) ABSTRACT An exhaust pipe for an internal combustion engine includes a metal tube enclosing a passage through which an exhaust gas from an internal combustion engine passes, and a ceramic film covering the metal tube from the outside. The ceramic film contains no more than about 0.5 atomic % of a metallic element which is dominantly present in a surface of the metal tube.

10 Claims, 10 Drawing Sheets

FOREIGN PATENT DOCUMENTS

| | | |
|---|---|---|
| JP | 07-102967 | 4/1995 |
| JP | 10-238320 A | 9/1998 |
| JP | 2823169 B | 9/1998 |
| JP | 2000-303833 | 10/2000 |
| JP | 2000-337126 | 12/2000 |
| JP | 3151713 B | 1/2001 |
| JP | 2001-106155 | 4/2001 |
| JP | 2001-329376 | 11/2001 |
| JP | 2002-501986 A | 1/2002 |
| JP | 3088978 U | 7/2002 |
| JP | 2002-276359 | 9/2002 |
| JP | 2002-332838 | 11/2002 |
| JP | 2003-232219 A | 8/2003 |
| JP | 2004-115907 A | 4/2004 |
| JP | 2004-518276 A | 6/2004 |

OTHER PUBLICATIONS

Official Communication issued in corresponding European Patent Application No. 05015142.2, mailed on Aug. 14, 2009.
Official Communication issued in corresponding Japanese Patent Application No. 2005-196980, mailed on Feb. 23, 2010.
Toshihiro Itou; "Titanium Part for Internal Combustion Engine"; U.S. Appl. No. 11/425,903, Jun. 22, 2006.

* cited by examiner

EXHAUST PIPE FOR INTERNAL COMBUSTION ENGINE

BACKGROUND OF THE INVENTION

1. Field of the Invention

The present invention relates to an exhaust pipe for an internal combustion engine, the exhaust pipe being used for guiding along an exhaust gas which is generated in the internal combustion engine. More particularly, the present invention relates to an exhaust pipe for an internal combustion engine such that at least a portion of the exhaust pipe appears on the exterior of a vehicle which incorporates the internal combustion engine.

2. Description of the Related Art

In many motorcycles or the like incorporating an internal combustion engine, the internal combustion engine is exposed in such a manner that the exterior appearance of the internal combustion engine can contribute to the aesthetic design of the motorcycle. In such a motorcycle, an exhaust pipe for guiding along exhaust gas from the internal combustion engine also plays an important role in the design of the motorcycle. Even in the case where the internal combustion engine is covered by a cowl or the like, the exhaust pipe is not likely to be completely covered by a cowl or a protector. Rather, it is often the case that at least a portion of the exhaust pipe appears on the exterior to become a part of the motorcycle design.

Figure 11:
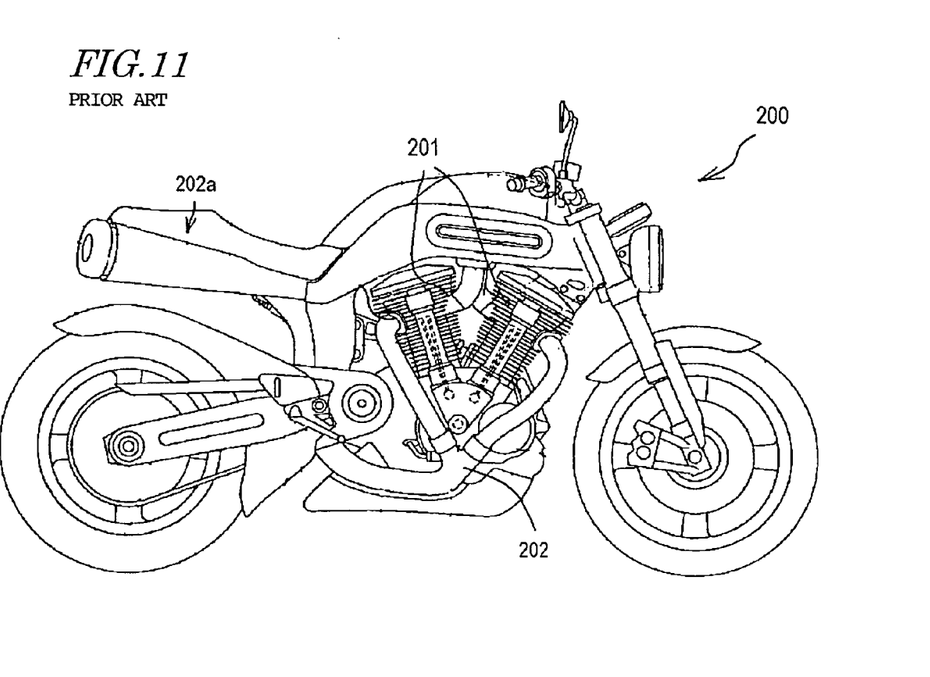
FIG. 11 is a side view showing the exterior appearance of a motorcycle.

FIG. 11 is a side view showing an example of a sports-type motorcycle. A motorcycle 200 shown in FIG. 11 includes a V-type engine 201 and an exhaust pipe 202 for guiding along exhaust gas. Two cylinders of the V-type engine 201 become united into the single exhaust pipe 202, which extends toward and above the rear wheel so as to allow exhaust gas to be discharged at the rear portion of the body. In the present specification, an "exhaust pipe" means the entirety of any structure which composes a channel for guiding along the exhaust gas from the internal combustion engine, and may include any portion composing a muffler 202a or the like.

In general, the exhaust pipe 202 must have a certain thickness for allowing the exhaust gas generated in the internal combustion engine 201 to be efficiently discharged. Moreover, the portion constituting the muffler 202a has an increased diameter in order to accommodate the muffling structure. For this reason, the exhaust pipe accounts for a relatively large part of the exterior appearance of the entire motorcycle, and thus, the shape and color of the exhaust pipe have an impact on the entire motorcycle design.

For these reasons, the shape and color of the exhaust pipe are important factors in deciding the entire motorcycle design. Therefore, it is common to construct the exhaust pipe in a smoothly bent shape to present a strong and voluminous impression, or finish the surface of the exhaust pipe with a lustered metal color or finish for an enhanced contrast against the other component parts, for example. Conversely, it is also common to finish the exhaust pipe with a similar color tone to those of the other component parts to obtain a consistent look with the surrounding structures.

In general, an exhaust pipe is formed by using carbon steel tubes for machine structural purposes (STKM), stainless steel (SUS), titanium, or the like. In the case of an exhaust pipe composed of STKM, the surface of the exhaust pipe is plated with chromium (Cr) in order to improve the exterior appearance of the exhaust pipe for the aforementioned reason.

However, the exhaust gas traveling through the exhaust pipe, which comes directly from the internal combustion engine, has a high temperature. Therefore, when the exhaust gas passes the exhaust pipe, the exhaust pipe reaches a high temperature, as a result of which the Cr-plated pipe surface may be discolored, oxidized, or otherwise deteriorated. In particular, some regions may suffer from reddish-brown discoloration. Moreover, even in the case of an exhaust pipe which has been formed of SUS or titanium without being Cr-plated, the surface may still be colored reddish-brown due to high temperature, the generated oxide film may peel, and/or change in color tone may result due to oxide film formation.

Thus, due to reddish-brown discoloration or surface deterioration of an exhaust pipe having metallic luster, there occurs a problem in that the exterior appearance of the entire motorcycle design is degraded. This problem is particularly outstanding in the recent years because the performance of internal combustion engines has been improved, resulting in an increased temperature of the exhaust gas.

This problem may be addressed by preventing the temperature of the exhaust pipe surface from becoming too high, by adopting a two-fold or three-fold cylindrical structure for the exhaust pipe. However, even by using a two-fold or three-fold cylindrical structure, the temperature of the exhaust pipe surface will not be adequately reduced, and surface oxidation or deterioration due to heat will not be completely prevented. Moreover, in this case, there is another problem in that the outer dimensions of the exhaust pipe are increased.

It might be possible to prevent discoloration or deterioration of the exhaust pipe surface by covering the exhaust pipe with a cowl or a protector so that the exhaust pipe will not show on the exterior. However, in this case, the exhaust pipe does not contribute to the entire motorcycle design, thus making it difficult to pursue the characteristic beauty of a motorcycle.

In order to solve the above-described problems, the inventor has proposed forming a silicon oxide film on an exhaust pipe of an internal combustion engine in order to prevent discoloration of the exhaust pipe (Japanese Laid-Open Patent Publication No. 2002-332838). As disclosed in Japanese Laid-Open Patent Publication No. 2002-332838, by forming a silicon oxide film having a thickness of about 0.05 µm or more on an exhaust pipe through sol-gel processing, it becomes possible to obtain an exhaust pipe which is unlikely to suffer from discoloration even when heated to a temperature of about 400° C.

However, it has been found that an exhaust pipe which is obtained by the technique disclosed in Japanese Laid-Open Patent Publication No. 2002-332838 may suffer from drastic surface discolorations due to exposure to a temperature exceeding 400° C. It has also been found that the silicon oxide film which is formed according to Japanese Laid-Open Patent Publication No. 2002-332838 is relatively soft, and thus does not have sufficient strength against impact. Therefore, discoloration may not be sufficiently prevented in the case where an exhaust pipe according to Japanese Laid-Open Patent Publication No. 2002-332838 is used for a high-performance internal combustion engine in which the exhaust gas will reach a high temperature as mentioned above. Moreover, in the case of a motorcycle, the exposed exhaust pipe may be bombarded with stones and sand during travel, and discoloration is likely to occur beginning from the marks, scrapes, indents and other deformations left on the surface of the exhaust pipe.

Furthermore, it has been found that interference fringes are likely to occur with a silicon oxide film which has been obtained through sol-gel processing, and that most conspicuous interference fringes appear with discoloration responsive to a temperature above 400° C.

SUMMARY OF THE INVENTION

In order to overcome the problems described above, preferred embodiments of the present invention provide an exhaust pipe for an internal combustion engine which has a high hardness and which can prevent discoloration and oxidation against a high-temperature exhaust gas.

An exhaust pipe for an internal combustion engine according to a preferred embodiment of the present invention includes a metal tube enclosing a passage through which an exhaust gas from the internal combustion engine passes, and a ceramic film covering the metal tube from the outside, containing no more than about 0.5 atomic % of a metallic element which is dominantly present in a surface of the metal tube.

In a preferred embodiment, the ceramic film is directly formed on the surface of the metal tube.

In a preferred embodiment, the ceramic film has a thickness in a range from about 5 nm to about 300 nm.

In a preferred embodiment, the ceramic film has a thickness in a range from about 5 nm to about 30 nm.

In a preferred embodiment, the metal tube has a surface roughness Ra in a range from about 0.4 µm to about 3.2 µm.

In a preferred embodiment, the ceramic film includes at least one material selected from the group consisting of oxides, nitrides, nitride-oxides, and borides of Si, Ti, Al, Zr, Mo, Nb, W, or V; and $B_4C$.

In a preferred embodiment, the metal tube is composed of titanium, a titanium alloy, or stainless steel.

In a preferred embodiment, the metal tube includes a chrome plating layer formed on a surface thereof.

In a preferred embodiment, substantially no oxide film of the metallic element which is dominantly present in the surface of the metal tube is present between the metal tube and the ceramic film.

In a preferred embodiment, the ceramic film is a vapor-deposited film formed by a vapor deposition technique.

In a preferred embodiment, the ceramic film is a vapor-deposited film formed by a sputtering technique or an ion plating technique.

In a preferred embodiment, the metal tube has a surface roughness greater than a surface roughness range in which diffracted light for visible light is expected to occur, and the ceramic film has a thickness smaller than a thickness range in which interference fringes for visible light is expected to occur.

Alternatively, an exhaust pipe for an internal combustion engine according to a preferred embodiment of the present invention includes a metal tube enclosing a passage through which an exhaust gas from the internal combustion engine passes, and a diamond-like carbon film covering the metal tube from the outside, containing no more than about 0.5 atomic % of a metallic element which is dominantly present in a surface of the metal tube.

Alternatively, an exhaust pipe for an internal combustion engine according to yet another preferred embodiment of the present invention includes a metal tube enclosing a passage through which an exhaust gas from the internal combustion engine passes, and an amorphous film covering the metal tube from the outside and having been formed by a vapor deposition technique.

An internal combustion engine device according to another preferred embodiment of the present invention includes an internal combustion engine, and any of the aforementioned exhaust pipes according to other preferred embodiments of the present invention, connected to the internal combustion engine.

A transportation apparatus according to a further preferred embodiment of the present invention includes the aforementioned internal combustion engine device.

A method of producing an exhaust pipe for an internal combustion engine according to yet another preferred embodiment of the present invention includes the steps of placing, into a vapor deposition apparatus, a metal tube enclosing a passage through which an exhaust gas from the internal combustion engine passes, and depositing on the metal tube a ceramic film having a thickness in a range from about 5 nm to about 300 nm.

In a preferred embodiment, the method further includes, between the placing step and the depositing step, a step of etching the surface of the metal tube.

In a preferred embodiment, the etching step is conducted by allowing plasma particles to collide with the surface of the metal tube.

In a preferred embodiment, the depositing step is conducted by a vapor deposition technique.

In a preferred embodiment, the depositing step is conducted by an ion plating technique or a sputtering technique.

Alternatively, a method of producing an exhaust pipe for an internal combustion engine according to another preferred embodiment of the present invention includes the steps of placing, into a vapor deposition apparatus, a metal tube enclosing a passage through which an exhaust gas from the internal combustion engine passes, and depositing on the metal tube a diamond-like carbon film having a thickness in a range from about 5 nm to about 300 nm.

The exhaust pipe according to various preferred embodiments of the present invention features a ceramic film that contains no more than about 0.5 atomic % of a metal which is dominantly present in the surface of the metal tube. Therefore, discoloration of the exhaust pipe and surface deterioration due to oxidation of such a metal at a high temperature are prevented. As a result, discoloration of the exhaust pipe due to a high-temperature exhaust gas is prevented, whereby a good exterior appearance can be maintained. In particular, a ceramic film which is formed by a vapor deposition technique is dense in texture, and therefore has a good shielding and protecting ability. Thus, external oxygen is prevented from reaching the metal tube, and the iron which is contained in the metal tube is prevented from oxidizing to deposit on the surface. As a result, discoloration of the exhaust pipe due to a high-temperature exhaust gas is prevented, whereby a good exterior appearance can be maintained. Since a ceramic film which is formed by a vapor deposition technique has a high hardness, a strong resistance against impact is also provided.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, preferred embodiments of the present invention will be described with reference to the accompanying drawings.

The inventor has conducted an in-depth study of the reasons why high temperature oxidation and/or discoloration on the surface cannot be sufficiently prevented with an exhaust pipe on which a silicon oxide film has been formed through sol-gel processing. As a result of the study, it has been found that a silicon oxide film obtained through sol-gel processing contains a metal which is dominantly present in the exhaust pipe surface, and that oxidation of the metal at a high temperature causes discoloration or surface deterioration of the exhaust pipe. Moreover, in a sol-gel processing, the organic compounds which were bound to silicon may undergo vaporization and decomposition during baking. Therefore, minute voids may occur in the resultant silicon oxide film, thus resulting in a low shielding ability against gas. Therefore, if the exhaust pipe is exposed to a high temperature, presumably, the metals at the exhaust pipe surface may diffuse into the silicon oxide film and oxidize by being bound to external oxygen, or oxygen may permeate through the silicon oxide film to cause oxidation of the metals at the exhaust pipe surface. Thus, it has been found that, in the case where metals are contained in the silicon oxide film or minute voids have occurred in the silicon oxide film, the iron within the metals composing the exhaust pipe may form a reddish-brown oxide deposit on the surface, thus degrading the exterior appearance of the exhaust pipe.

The inventor has performed various experiments by paying particular attention to a ceramic film which is obtained by a vapor deposition technique as a film for preventing oxidation at the exhaust pipe surface. As a result, the inventor has discovered that a ceramic film obtained by a vapor deposition technique is able to solve the problems associated with a silicon oxide film obtained through sol-gel processing, and therefore is suitable as a film for preventing oxidation of an exhaust pipe. Hereinafter, preferred embodiments of the present invention will be described.

Figure 1:
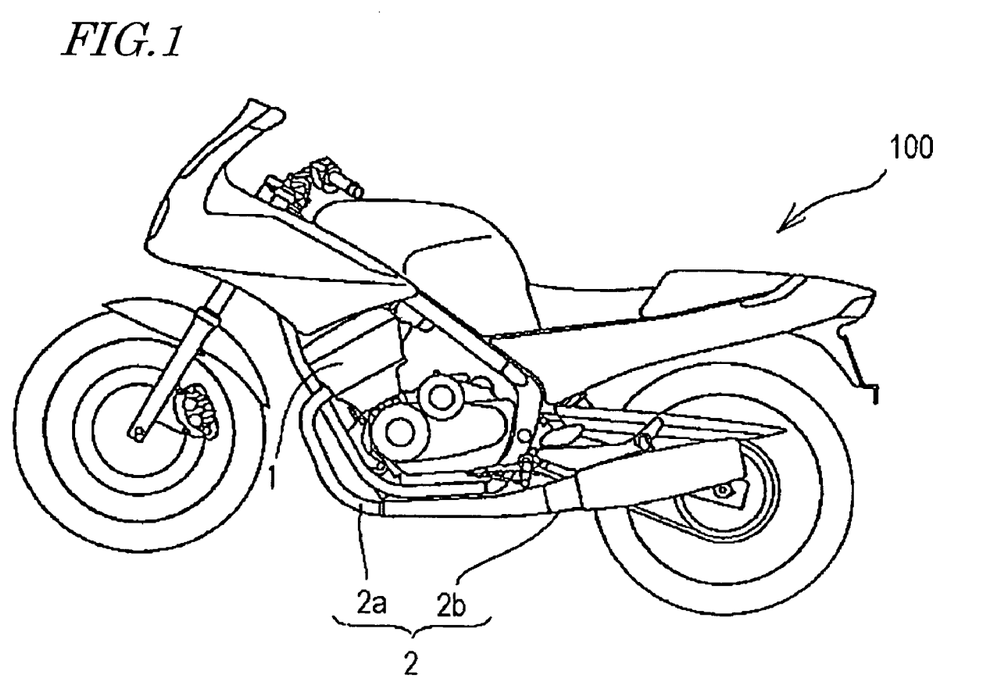
FIG. 1 is a side view showing a motorcycle in which an exhaust pipe for an internal combustion engine according to a preferred embodiment of the present invention is used.

FIG. 1 shows a motorcycle 100 in which an exhaust pipe for an internal combustion engine according to a preferred embodiment of the present invention (which hereinafter may be simply referred to as an "exhaust pipe") is used. The motorcycle 100 includes an internal combustion engine 1 and an exhaust pipe 2 which is connected to the internal combustion engine 1.

The exhaust pipe 2 is provided in order to allow the exhaust gas which is generated in the internal combustion engine 1 to be discharged at the rear of the body. The exhaust pipe 2 includes a bent portion 2a, which constitutes a substantially bent exhaust path for allowing the exhaust gas having been discharged at the front of the internal combustion engine 1 to be guided toward the rear, and a muffler 2b. The exhaust pipe 2 may be integrally formed of a single part, or composed of a plurality of parts which are connected with one another.

Figure 10:
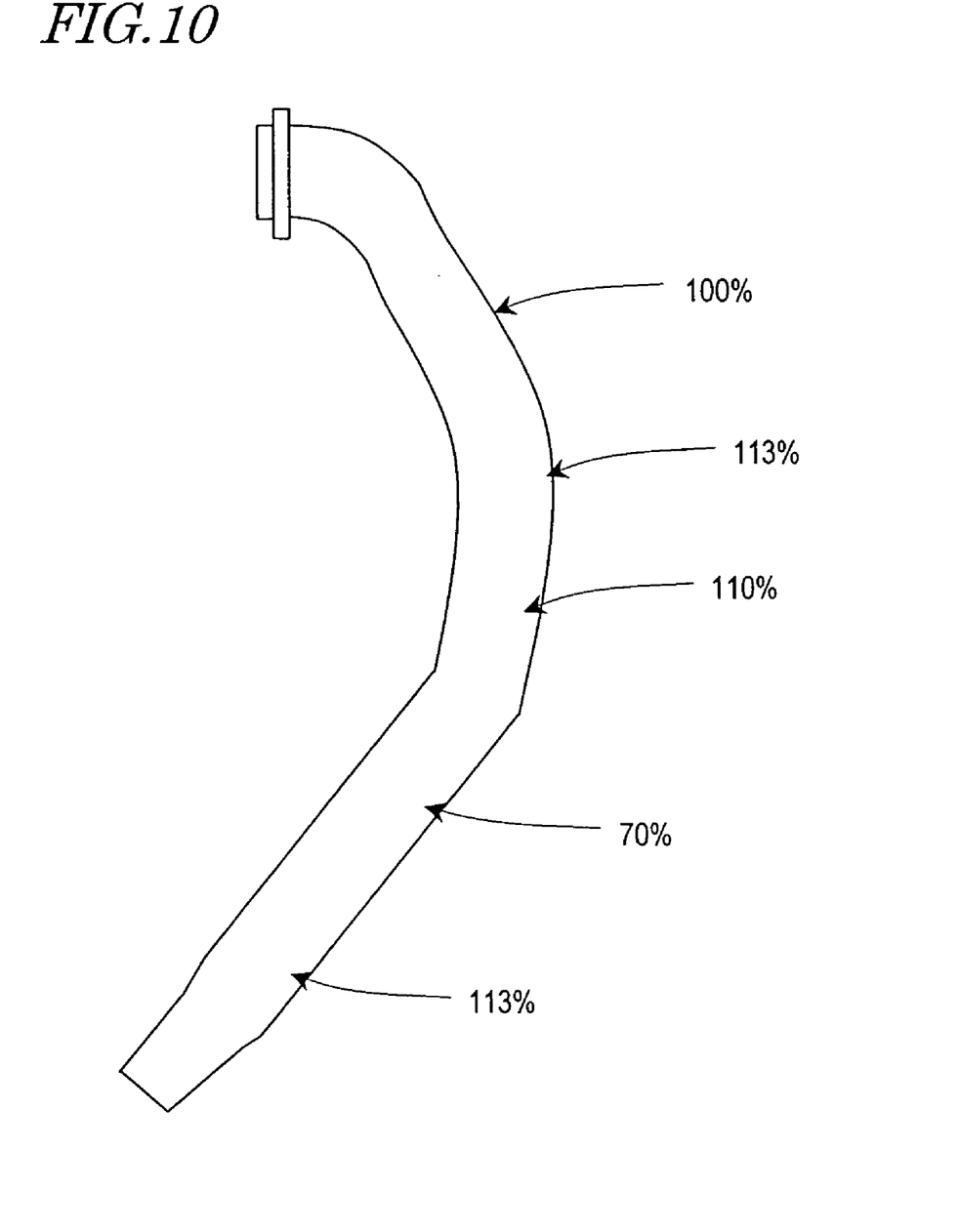
FIG. 10 is a diagram for explaining a ceramic film distribution in the exhaust pipe for an internal combustion engine according to a preferred embodiment of the present invention.

In the present preferred embodiment, the exhaust pipe 2 is preferably entirely exposed so as to appear on the exterior of the motorcycle 100, thus constituting a part of the overall design of the motorcycle 100. As will be specifically described below, the unique effects and advantages of preferred embodiments of the present invention, i.e., discoloration of the exhaust pipe 2 is prevented and the fresh exterior appearance of a brand-new motorcycle is retained for long periods of time, is more clearly enhanced in the case where the entire exhaust pipe 2 is exposed. However, as long as the exhaust pipe 2 at least partially appears on the exterior, another portion of the exhaust pipe 2 may be covered by a cowl or a protector, depending on the design of the motorcycle. Moreover, the shape of the motorcycle for which the exhaust pipe for an internal combustion engine according to preferred embodiments of the present invention is adopted is not limited to that shown in FIG. 1. For example, the exhaust pipe according to a preferred embodiment of the present invention may be adopted in a motorcycle having a structure as shown in FIG. 10.

Figure 2:
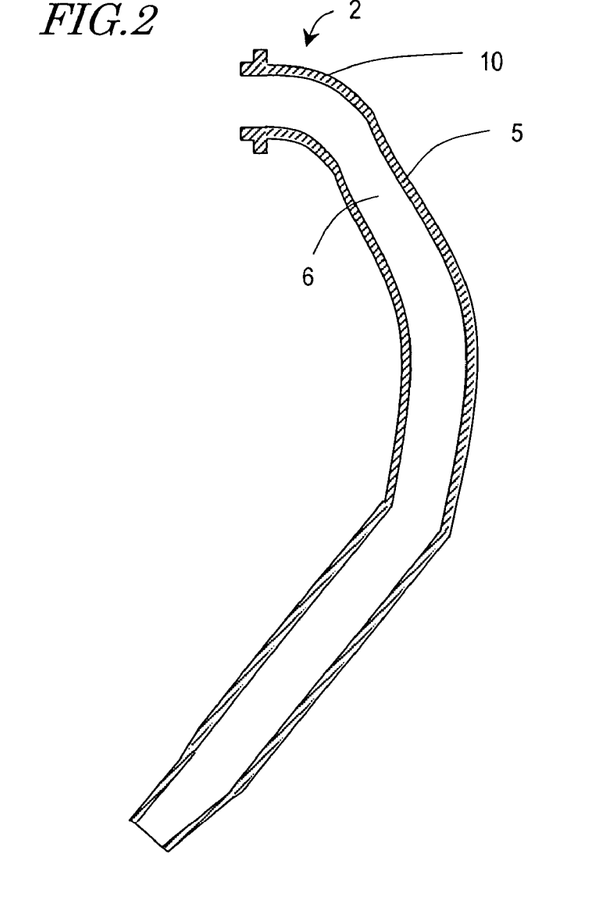
FIG. 2 is a cross-sectional view of an exhaust pipe for an internal combustion engine according to a preferred embodiment of the present invention.

FIG. 2 is a cross-sectional view showing a portion (portion 2a) of the exhaust pipe 2. The exhaust pipe 2 includes a metal tube 5 enclosing a passage 6 through which exhaust gas is allowed to pass, and a ceramic film 10 covering the metal tube 5 from the outside. Stated otherwise, exhaust gas flows inside the metal tube 5, and the ceramic film 10 is provided on the outside of the metal tube 5. Note that the metal tube 5 only needs to enclose the passage 6. Therefore, a double tube structure may be adopted such that an inner tube which directly encloses the passage 6 is surrounded by an outer tube on the outside. However, the effects and advantages of the present invention will be more enhanced in the case of a single tube structure which directly encloses the passage 6, because, the temperature is likely to become high on the outside of the metal tube 5. Moreover, the ceramic film 10 only needs to be provided in a region where prevention of oxidation is expected, in such a manner as to cover the metal tube 5 from the outside to prevent the metal tube 5 from being in contact with air (e.g., oxygen). Any other film or layer may be additionally formed between the metal tube 5 and the ceramic film 10, and a further film may cover the ceramic film 10 from the outside.

The metal tube 5 is preferably composed of carbon steel tubes for machine structural purposes (STKM), stainless steel (SUS), titanium, a titanium alloy, a nickel alloy, an aluminum alloy, or other suitable material. In order to enhance the metallic luster and decorativeness of the surface, a plating (e.g., a chrome plating) layer may be formed. Since STKM does not have enough metallic luster for providing a high level of decorativeness, when a metal tube 5 composed of STKM is used, it is preferable that the metal tube 5 be chrome plated, or nickel-and-chrome plated. Moreover, in the case of using a metal tube 5 composed of SUS, its surface may have been subjected to electrolytic polishing.

The ceramic film 10 is preferably composed of an amorphous material which is dense in texture and is unlikely to be oxidized or decomposed even at a high temperature. Specifically, the ceramic film 10 includes at least one type of material selected from among oxides, nitrides, nitride-oxides or borides of an element such as silicon (Si), titanium (Ti), aluminum (Al), zirconium (Zr), molybdenum (Mo), niobium (Nb), tungsten (W), or vanadium (V). Such a material does not necessary have to contain the respective elements at the stoichiometric ratios. The ceramic film 10 may contain $B_4C$ (boron carbide). The ceramic film 10 may include one or more layers of such a material(s).

Note that, as used herein, the term "ceramic" broadly means a solid material such as an oxide, nitride, nitride-oxide, boride, or carbide of a metal or a nonmetal. The term "ceramic" encompasses not only those materials which are formed by a technique involving a baking step (as has traditionally been practiced), but also those materials which are formed by a vapor deposition technique, as already mentioned above.

From the perspective of facilitating the formation method and facilitating the material acquisition, it would be preferable to use an oxide, nitride, or nitride-oxide of Si. In other words, it is preferable that the ceramic film 10 be formed of a silicon oxide, a silicon nitride, or a silicon nitride oxide. Note that, generally speaking, a nitride is denser in texture, and is higher in hardness, than an oxide. From a similar perspective, it would also be preferable to use an oxide, nitride, or nitride-oxide of Al. In other words, it is also preferable that the ceramic film 10 be formed of an aluminum oxide, an aluminum nitride, or an aluminum nitride oxide.

Preferably, the ceramic film 10 contains no more than about 0.5 atomic % of a metal which is dominantly (typically at a ratio of about 50% or more) present in the surface of the metal tube 5. If more than about 0.5 atomic % of a metal which is dominantly present in the surface of the metal tube 5 (i.e., a metal substantially composing the surface of the metal tube 5) is contained in the ceramic film 10, this metal may be oxidized from the surface of the ceramic film 10 due to high temperature, possibly causing discoloration of the surface of the exhaust pipe 2. Moreover, it is also possible that the oxidation may progress from the oxidized metal into the interior of the metal tube 5. When taking into consideration the exterior appearance of the exhaust pipe in the case where the metal contained in the ceramic film 10 is oxidized, the amount of a metal which is dominantly present in the surface of the metal tube 5 contained in the ceramic film 10 is preferably about 0.4 atomic % or less, and more preferably about 0.3 atomic % or less.

Note that the percentage content of the metal which is dominantly present in the surface of the metal tube 5 may have local fluctuations within the ceramic film 10. However, it is still preferable that the percentage content is about 0.5 atomic % or less at least in a central portion of the ceramic film 10 along the thickness direction. Moreover, it is preferable that the percentage content is about 0.5 atomic % or less in a portion excluding the area near the inner (i.e., closer to the metal tube 5) surface of the ceramic film 10 and the area near the outer surface. Assuming that the area near the inner surface and the area near the outer surface each account for about 10% of the overall thickness of the ceramic film 10, such a portion would correspond to about 80% of the entire ceramic film 10.

Preferably, the ceramic film 10 is formed by a method which, when forming the ceramic film 10 on the outside of the metal tube 5, does not allow a metal which is dominantly present in the surface of the metal tube 5 to be diffused into and stay included in the resultant ceramic film 10. Specifically, it is preferable that the ceramic film 10 is formed by a vapor deposition technique. In the present specification, a "vapor deposition technique" refers to a CVD (chemical vapor deposition) technique and a physical vapor deposition technique, both which allow the matter to be deposited to be deposited in a gaseous state. In the present invention, it is more preferable to use a physical vapor deposition technique as the vapor deposition technique. Since a film which is formed by an ion plating technique or a sputtering technique is generally dense in texture, it is particularly preferable that the ceramic film 10 is formed by an ion plating technique or a sputtering technique.

In the case of adopting a sputtering technique, it is possible to use a DC sputtering apparatus, an RF sputtering apparatus, a magnetron sputtering apparatus, an ion beam sputtering apparatus, or other suitable sputtering apparatus. In the case where any such method is used, plasma particles are allowed to collide against the surface of the metal tube 5 on which the ceramic film 10 is to be deposited, thus etching the surface of the metal tube 5. By utilizing this effect, the naturally-occurring oxide film (if any) on the surface of the metal tube 5 can be removed, thus improving the contact between the ceramic film 10 and the metal tube 5. Even in the case of forming the ceramic film 10 by a deposition method which does not utilize plasma, it would be preferable to remove any naturally-occurring oxide film on the surface of the metal tube 5 by a physical or chemical method, prior to forming the ceramic film 10.

A ceramic film which is formed by a vapor deposition technique is dense in texture, and therefore has a high gas shielding ability even at a temperature of about 500° C., thus preventing oxidation of the surface of the metal tube 5.

Many of the ceramic films which are formed by a vapor deposition technique using the materials exemplified above are amorphous films, and will remain amorphous even when heated to a high temperature during engine operation. As used herein, an "amorphous film" is a film which lacks any long-periodic structure that can be observed as diffraction peaks by an X-ray diffraction technique. Depending on the material, the resultant film may be partly crystallized, but this will not present any practical problems in terms of gas shielding ability.

Figure 3:
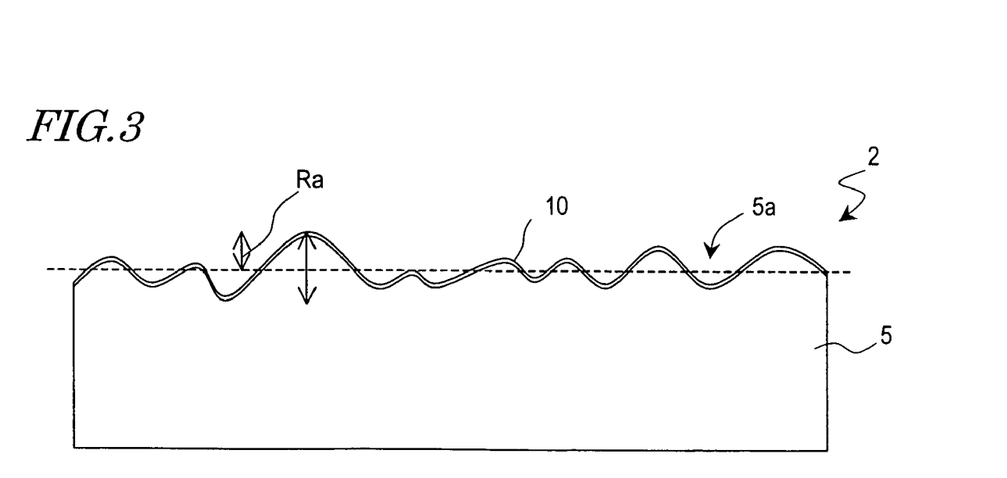
FIG. 3 is a schematic structural illustration around the surface of the exhaust pipe for an internal combustion engine according to a preferred embodiment of the present invention.

FIG. 3 is an enlarged cross-sectional view showing the area of the surface of the exhaust pipe 2. As shown in FIG. 3, the surface of the metal tube 5 has a large surface roughness relative to the thickness of the ceramic film 10. Specifically, the surface of the metal tube 5 has an average roughness Ra of about 0.4 μm or more. If the average roughness is smaller than about 0.4 μm, when visible light is reflected from the surface of the metal tube 5, mutual intensification may occur if the optical path difference between wave fronts reflected from adjoining grooves is equal to an integer multiple of the wavelength, thus causing diffracted light. If this happens, the aesthetic exterior appearance of the exhaust pipe 2 may be degraded. Moreover, if the average roughness is so small that the surface of the metal tube 5 is smooth, the ceramic film 10 may have poor contact with the surface of the metal tube 5.

As far as the above reasons are concerned, there is no upper limit to the value of the average roughness Ra of the surface of the metal tube 5. However, if the average roughness Ra of the surface of the metal tube 5 is about 3.2 μm or more, marketability and aesthetics may be undesirably affected due to low light reflectance.

The thickness of the ceramic film 10 is preferably in the range from about 5 nm to about 300 nm. If the thickness is smaller than about 5 nm, it becomes difficult to form a ceramic film 10 which uniformly covers the metal tube 5. Moreover, a sufficient gas shielding ability will not be obtained, thus making complete prevention of oxidation or discoloration of the surface of the metal tube 5 difficult. On the other hand, if the thickness is greater than about 300 nm, a longer time will be required for forming the ceramic film 10 and thus, the production efficiency will be lowered, which is not preferable. Moreover, interference colors are likely to be observed if the thickness is greater than about 300 nm, or if the ceramic film 10 does not have a perfectly uniform thickness. In such cases, the decorativeness of the exterior appearance will be degraded. In terms of the production efficiency of the ceramic film 10, the thickness of the ceramic film 10 is preferably about 50 nm or less, and more preferably, about 40 nm or less.

In the aforementioned range, by appropriately selecting a thickness while paying attention to the refractive index of the ceramic film to be formed, it is possible to arbitrarily choose the color and transparency of the ceramic film 10. For example, assuming that the ceramic film 10 has a refractive index in the range from about 1.7 to about 2.0, the ceramic film 10 will be colorless and transparent in a thickness range from about 5 nm to about 30 nm; colored and transparent in a thickness range from about 30 nm to about 120 nm; or colored and opaque in a thickness range from about 120 nm to about 300 nm. Therefore, by prescribing the thickness of the ceramic film 10 to be in the range from about 5 nm to about 30 nm, it becomes possible to obtain an exhaust pipe in which the color tone of the surface of the metal tube 5 is dominant, and which prevents oxidation due to exhaust gas. By prescribing the thickness of the ceramic film 10 to be in the range from about 30 nm to about 120 nm, it becomes possible to obtain an exhaust pipe having a coloration that cannot be achieved with a conventional exhaust pipe, such that the color tone of the ceramic film 10 is overlaid on the color tone of the surface of the metal tube 5. Within this range, the color of the ceramic film 10 itself changes, in the order of gold-red-blue-gold, as the thickness increases. Lastly, by prescribing the thickness of the ceramic film 10 to be in the range from about 120 nm to about 300 nm, it becomes possible to obtain an exhaust pipe which has a coloration ascribable to the ceramic film 10, and which has excellent anti-abrasion/anti-impact properties.

Note that a colorless and transparent ceramic film 10 which is free of interference colors can be obtained if the thickness of the ceramic film 10 is in the range from about 5 nm to about 30 nm, regardless of the material and the refractive index value of the ceramic film 10. In other words, on the surface of a metal tube having a surface roughness that is greater than the surface roughness range in which diffracted light for visible light would occur, by forming a ceramic film having a thickness that is smaller than the thickness range in which interference fringes for visible light would occur, it becomes possible to obtain an exhaust pipe which will be immune to surface oxidation or discoloration even if a high-temperature exhaust gas passes therethrough, and which will show excellent contact and have a uniform metallic luster free of interference fringes.

Next, a method of producing the exhaust pipe 2 will be described. The following description will illustrate an example where the ceramic film 10 is formed by a sputtering technique.

Figure 4A:
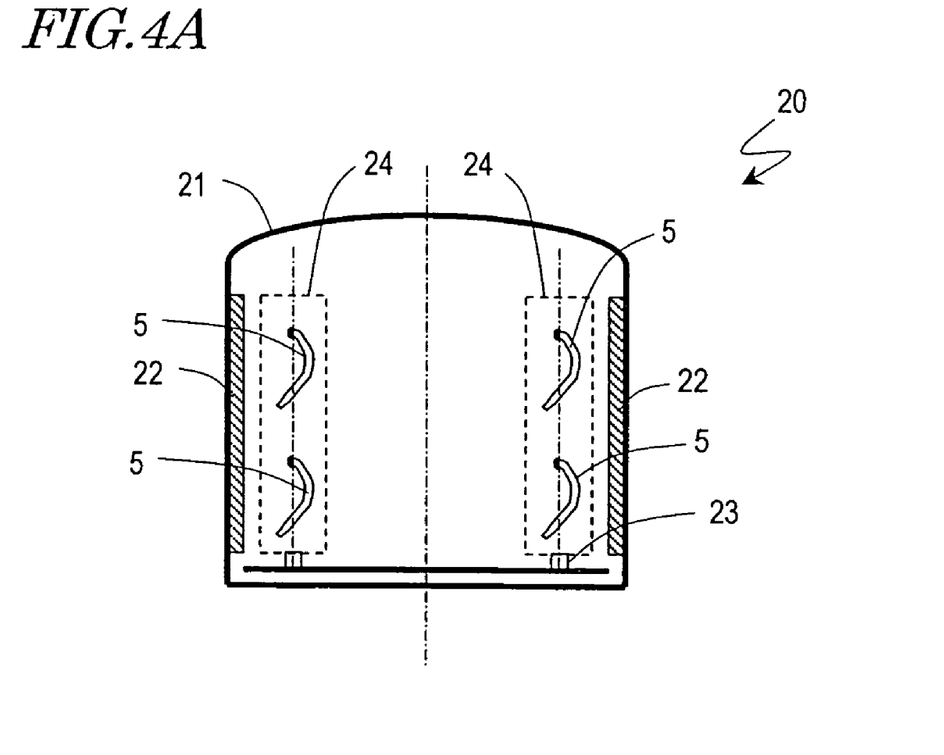
FIGS. 4A and 4B are a side cross-sectional view and an upper cross-sectional view, respectively, schematically showing the structure of a sputter vapor deposition apparatus used for the production of the exhaust pipe for an internal combustion engine according to a preferred embodiment of the present invention.
Figure 4B:
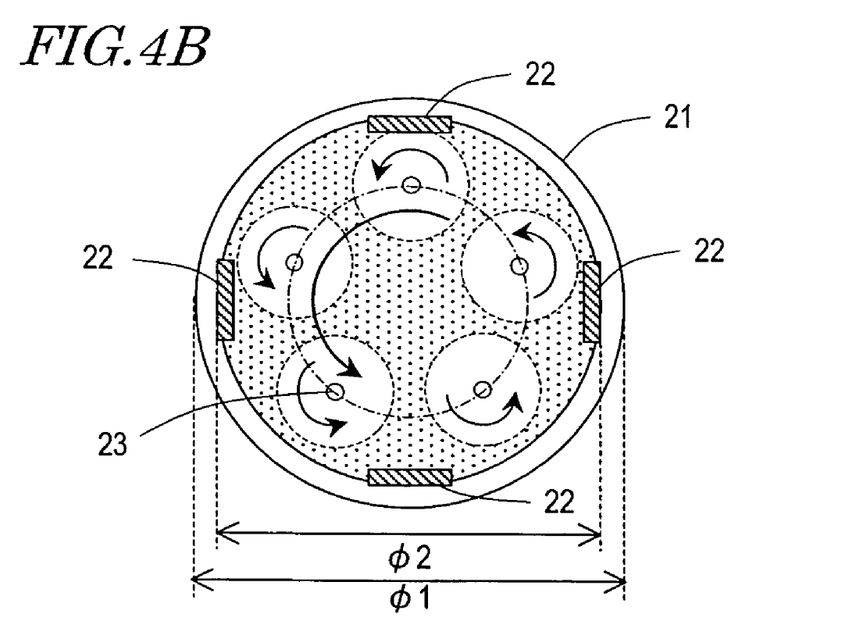

First, a metal tube 5 is prepared. In the case where the metal tube 5 is formed from STKM as mentioned earlier, the metal tube 5 is preferably subjected to chrome plating in order to improve a metallic luster and decorativeness to the surface. Next, as shown in FIGS. 4A and 4B, the metal tube 5 is introduced into a chamber 21 of a sputter vapor deposition apparatus 20. The sputter vapor deposition apparatus 20 includes a plurality of holders 24, each capable of retaining and suspending two metal tubes 5 on top of one another, thus making it possible to form films on a multitude of metal tubes 5 simultaneously. Each holder 24 orbits within the chamber 21 while rotating around a pivot axis 23. The sputter vapor deposition apparatus 20 includes a plurality of targets 22 outside of the orbit along which the holders 24 revolve. In the case where a silicon nitride film is to be formed as the ceramic film 10, silicon targets 22 are preferably used. Alternatively, silicon nitride targets may be used. The chamber 21 preferably has an inner diameter φ1 of, for example, about 1200 mm. An effective region (i.e., a region in which actual film formation takes place) may be a cylindrical space defined by a diameter φ2 of about 1080 mm and a height of about 1800 mm, for example. By using the sputter vapor deposition apparatus 20 having such a structure, it becomes possible to form the ceramic film 10 with a uniform thickness, entirely around the outside of each metal tube 5 which has a three-dimensional shape. It also becomes possible to process many metal tubes 5 in a single batch.

The metal tube 5 is placed in each holder 24, and the chamber 21 is evacuated by using a pump (not shown). Once the inside of the chamber 21 reaches a predetermined degree of vacuum, argon is introduced into the chamber 21, and then an electric discharge is begun. While allowing the holders 24 to rotate and orbit, a bias voltage is applied in such a manner that the plasma particles generated by the electric discharge collide with each metal tube 5, and the surface of each metal tube 5 is etched by reverse sputtering. The reverse sputtering is preferably conducted until the naturally-occurring oxide film present on the surface of the metal tube 5 is completely removed. Such a naturally-occurring oxide film generally has a thickness in the range from about 2 nm to about 3 nm. By removing the naturally-occurring oxide film, the contact between the metal tube 5 and the ceramic film 10 can be strengthened.

After removing the naturally-occurring oxide film, argon gas and nitrogen gas are introduced into the chamber 21, and an electric discharge is begun. A bias voltage is applied in such a manner that the plasma particles will collide against the targets, whereby the deposition of the ceramic film 10 is begun. In the present preferred embodiment, silicon particles which have emitted from the targets react with nitrogen plasma, and are deposited on the surface of the metal tube 5 in the form of a silicon nitride film. The deposition time is to be determined in accordance with the intended film thickness of the ceramic film to be formed, while paying attention to conditions such as the number of targets and the pressure and bias voltage during reaction. Sputtering is performed for a predetermined amount of time to form the ceramic film 10 so as to have a predetermined thickness on the outside of the metal tube 5, whereby the exhaust pipe 2 is obtained.

The exhaust pipe of a preferred embodiment of the present invention features a ceramic film that contains no more than about 0.5 atomic % of a metal which is dominantly present in the surface of the metal tube. In fact, substantially no metal which is a main component of the metal tube surface is contained in the ceramic film. Therefore, discoloration of the exhaust pipe and surface deterioration due to oxidation of such a metal at a high temperature are prevented. As a result, discoloration of the exhaust pipe due to a high-temperature exhaust gas is prevented, whereby a good exterior appearance can be maintained.

In particular, a ceramic film which is formed by a vapor deposition technique is dense in texture, and therefore has a good shielding ability. Thus, external oxygen is prevented from reaching the metal tube, and the iron which is contained in the metal tube is prevented from oxidizing to deposit on the surface. As a result, discoloration of the exhaust pipe due to a high-temperature exhaust gas is prevented, whereby a good exterior appearance can be maintained.

In terms of forming a film which is dense in texture, the aforementioned method of directly forming a ceramic film through a vapor deposition technique is better than a method in which a metal film is once formed by a sputtering or ion plating technique and thereafter a metal oxide film is formed through heat treatment. In a method in which a metal film is once formed and thereafter is subjected to oxidation, the denseness of the film decreases through oxidation, and the oxidation will continue during subsequent use. On the other hand, in a method in which a ceramic film is directly formed by a vapor deposition technique, an already oxidized or nitridized film is formed, so that the film will no longer react. Therefore, no film deterioration will occur after the film formation, and denseness will be conserved.

Moreover, by varying the thickness of the ceramic film, it becomes possible to arbitrarily choose the transparency and/or color tone of the ceramic film. Therefore, an exhaust pipe can be obtained which has a color tone that cannot be achieved with conventional methods, and which will retain its color tone for long periods of time without changing responsive to the heat of the exhaust gas.

An exhaust pipe for an internal combustion engine according to a preferred embodiment of the present invention can be used in a wide variety of applications, such as, a vehicle having an internal combustion engine (e.g., a motorcycle or an all-climate four-wheel vehicle) and a transportation apparatus having an internal combustion engine (e.g., a marine vessel or an airplane).

Instead of what has been illustrated above, a film composed of diamond-like carbon (DLC) may be formed so as to cover the metal tube 5 from the outside, thus preventing oxidation of the exhaust pipe surface. A DLC film is composed of carbon which is in an amorphous state and has good thermal conductivity as well as good gas shielding ability, and therefore can be used similarly to the above-illustrated film. In the case of using a DLC film, it is preferable to form the DLC film by using a CVD (chemical vapor deposition) technique.

ANALYSIS AND EXPERIMENTAL EXAMPLES

Firstly, with respect to exhaust pipes according to preferred embodiments of the present invention and an exhaust pipe as disclosed in Japanese Laid-Open Patent Publication No. 2002-332838, supra, distribution of elements along a depth direction was examined. As an example of the exhaust pipe according to a preferred embodiment of the present invention (FIGS. 5A and 5B), a metal tube composed of STKM was prepared, whose surface had been subjected to nickel plating and chrome plating, and on this metal tube, a silicon oxide film (as a ceramic film) was formed by using a sputtering technique. The formation of the silicon oxide film was performed as follows. The metal tube (which had been subjected to nickel plating and chrome plating) was placed in a chamber of a magnetron sputtering apparatus, and the chamber was evacuated until reaching a vacuum degree of about $3 \times 10^{-4}$ Pa. Thereafter, argon was introduced into the chamber at a flow rate of about 25 sccm. While maintaining a pressure of about 0.4 Pa, a reverse sputtering was performed for approximately 1.5 minutes by supplying power at 500 V and 4 A (2 KW), thus removing the naturally-occurring oxide film on the metal tube surface. Thereafter, silicon and oxygen were introduced into the chamber, and by using a silicon target, a sputtering was performed for approximately 1 minute by supplying power at 700 V and 4 A (4.9 KW) while maintaining a pressure of about 0.2 Pa, thus forming a silicon oxide film having a thickness of about 25 nm on the metal tube surface. As another example of the exhaust pipe according to a preferred embodiment of the present invention (FIGS. 6A and 6B), a similar sputtering technique was performed under a different film formation condition to form a silicon oxide film to a thickness of about 250 nm on the surface of a metal tube.

As a conventional example (FIGS. 7A and 7B), a metal tube similar to that described above was prepared, and a ceramic film was formed thereon through sol-gel processing. With respect to the exhaust pipes according to a preferred embodiment of the present invention and the conventional exhaust pipe thus obtained, distribution of elements along the depth direction was measured by using a GDS (glow discharge spectroscopy) technique.

Figure 5A:
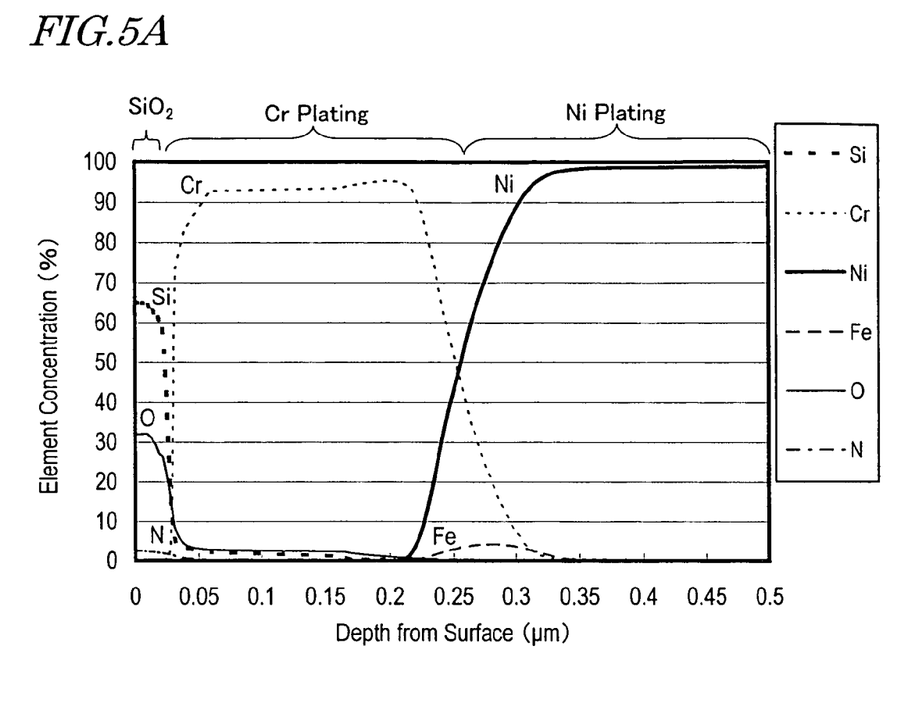
FIGS. 5A and 5B are graphs each showing element distributions along the depth direction of an exhaust pipe for an internal combustion engine according to a preferred embodiment of the present invention, where the distribution is obtained through a GDS analysis.
Figure 5B:
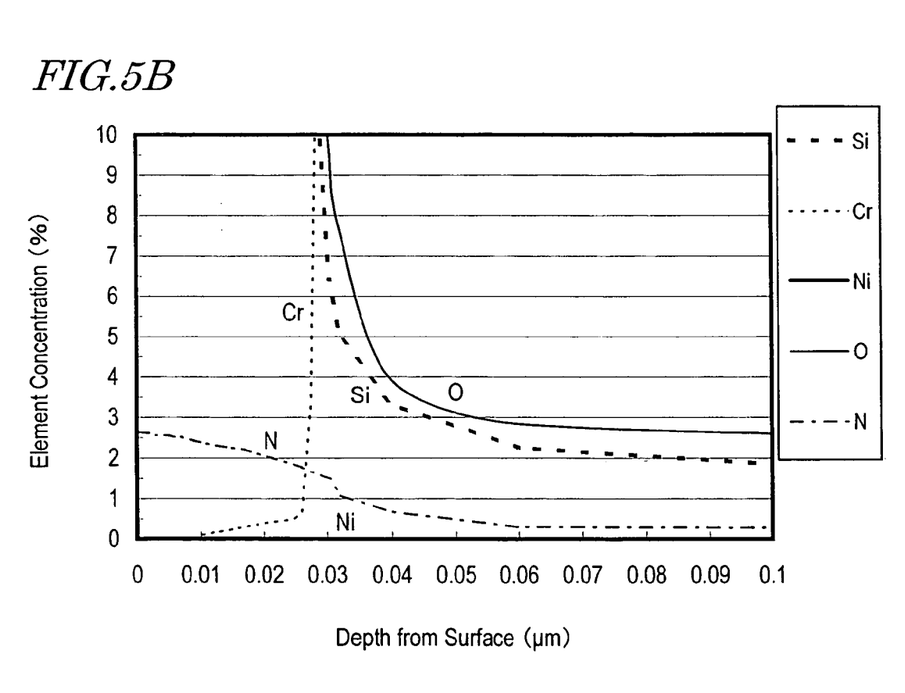
Figure 6A:
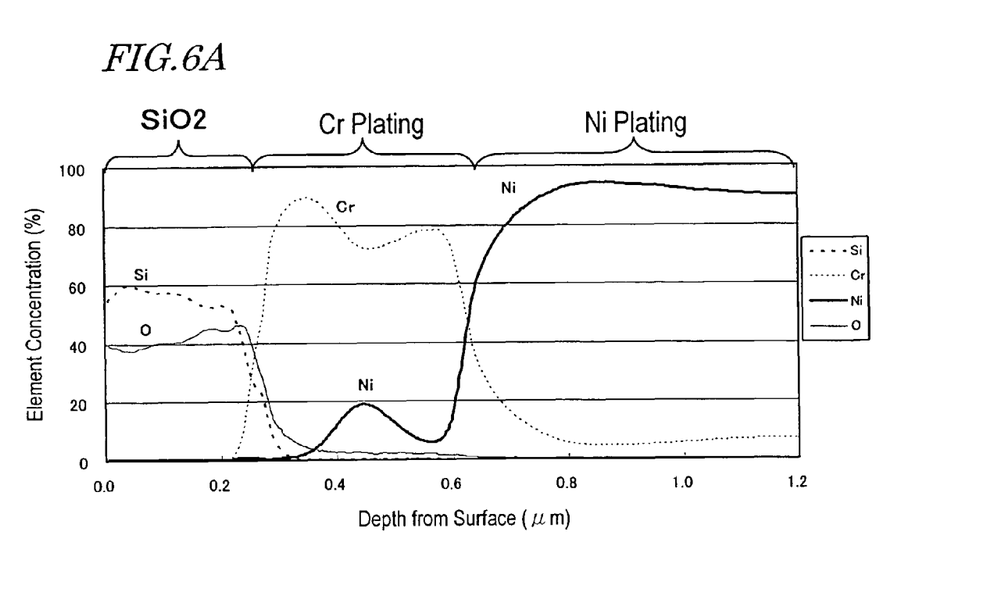
FIGS. 6A and 6B are graphs each showing element distributions along the depth direction of an exhaust pipe for an internal combustion engine according to a preferred embodiment of the present invention, where the distribution is obtained through a GDS analysis.
Figure 6B:
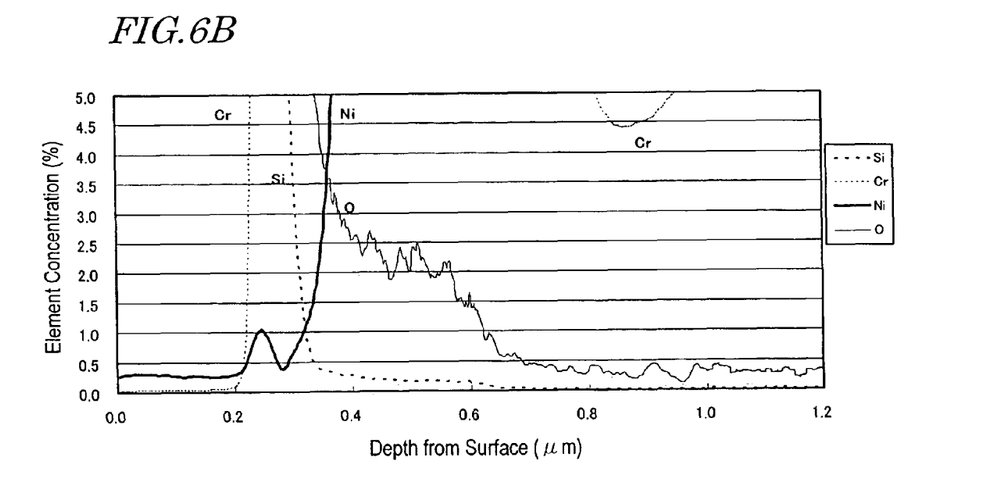

FIGS. 5A and 6A each show element distributions along the depth direction of an exhaust pipe according to a preferred embodiment of the present invention. FIGS. 5B and 6B are enlarged diagrams showing element distributions in the area near the surface in FIGS. 5A and 6A, respectively. As is clear from these figures, in accordance with the exhaust pipe according to a preferred embodiment of the present invention, chromium, which is a main metal component in the surface of the metal tube, is hardly contained in the silicon oxide film (ceramic film). Specifically, the element concentration of chromium begins at about 0.5% or less (e.g., about 0.1% in FIG. 6B), and rapidly increases at the boundary between the silicon oxide film and the chrome plating. Moreover, the respective profiles showing silicon and oxygen concentrations are decreasing near the boundary between the silicon oxide film and the chrome plating, with substantially the same gradient. This means that chromium has not diffused into the silicon oxide film, and that oxygen is bound to silicon at the boundary between the silicon oxide film and the chrome plating, such that there exists hardly any oxide film of chromium (i.e., naturally-occurring oxide film of chromium).

Figure 7A:
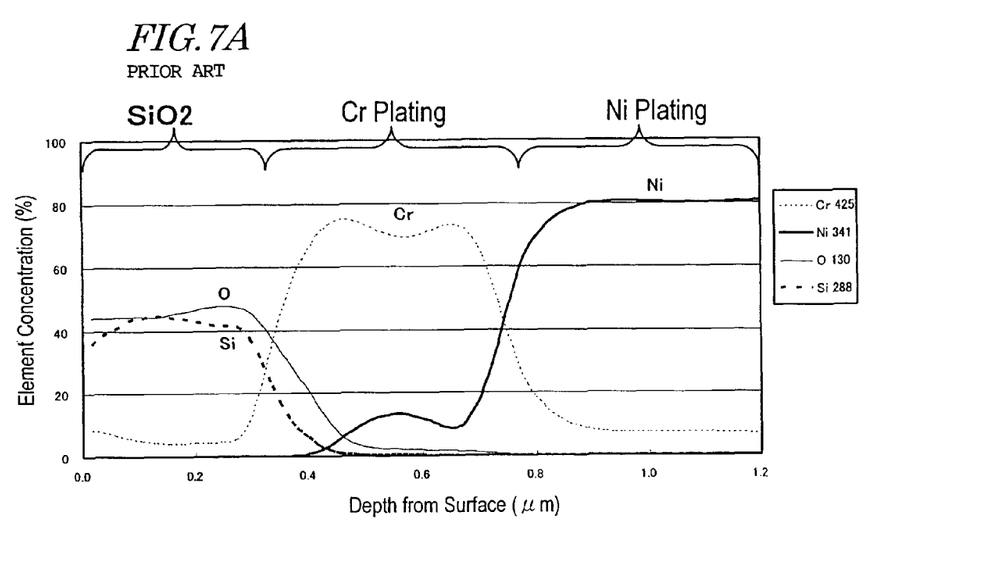
FIGS. 7A and 7B are graphs each showing element distributions along the depth direction of a conventional exhaust pipe for an internal combustion engine, where the distribution is obtained through a GDS analysis.
Figure 7B:
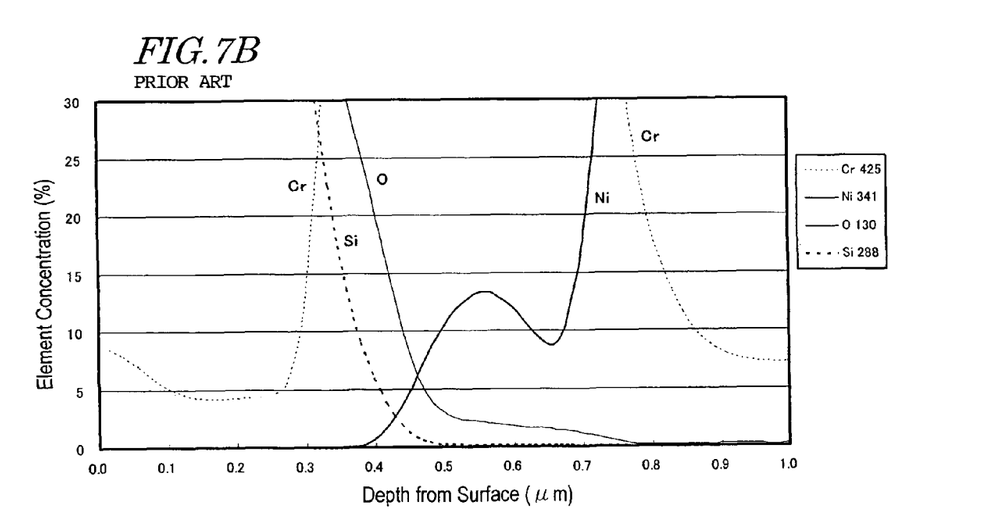

FIG. 7A shows element distributions along the depth direction of the conventional exhaust pipe. FIG. 7B is an enlarged diagram showing element distributions in the area near the surface in FIG. 7A. As is clear from these figures, in the conventional exhaust pipe, chromium, which is a main metal component in the surface of the metal tube, is contained at a rate of about 4 atomic % in the silicon oxide film, which has been formed through sol-gel processing. At the boundary between the silicon oxide film and the chrome plating, chromium concentration increases rather gently. The profile of oxygen concentration shows that, as compared to silicon, oxygen exists deep into the interior of the exhaust pipe and with a high rate. This presumably indicates that chromium has diffused into the silicon oxide film which has been formed through sol-gel processing, and oxygen which is bound to chromium (i.e., chromium oxide) is present at the boundary between the silicon oxide film and the chrome plating.

Figure 8:
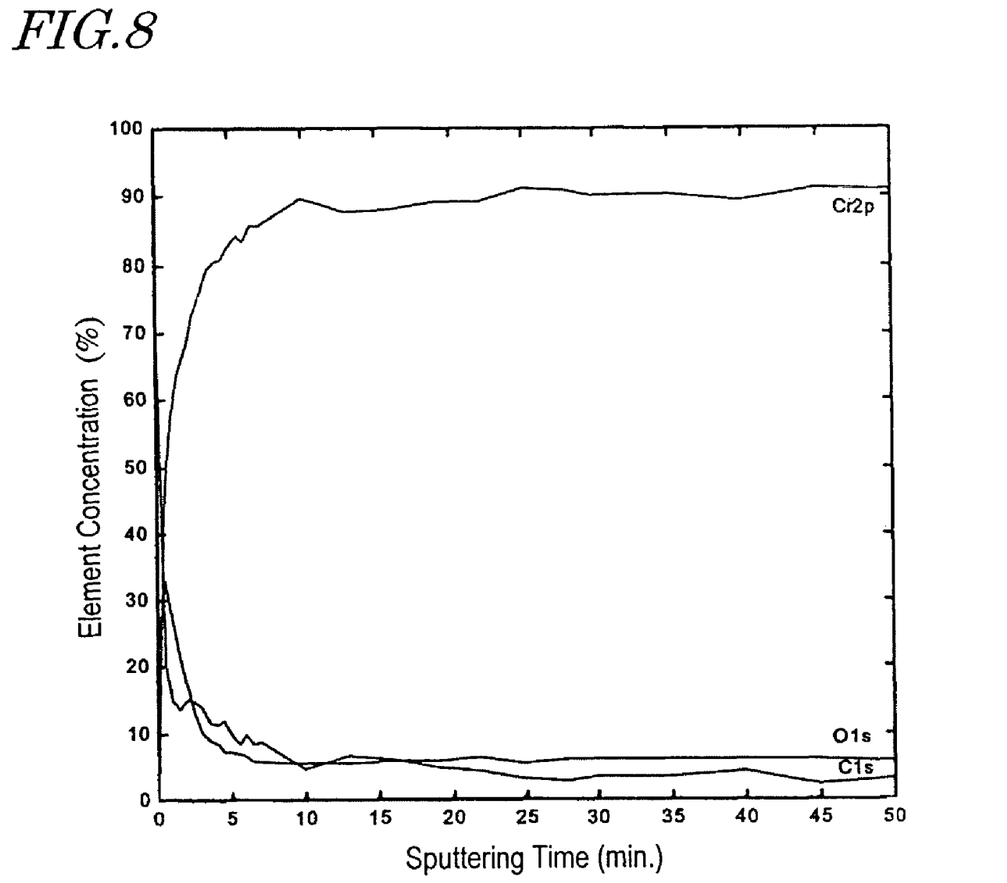
FIG. 8 is a graph showing element distributions along the depth direction of a chrome plating film, where the distribution is obtained through an XPS analysis.

In order to examine the state of the boundary between the silicon oxide film and the chrome plating in the conventional exhaust pipe, element concentration profiles along the depth direction of the conventional exhaust pipe were further measured by an XPS technique (X-ray photoelectron spectroscopy). First, in order to examine the thickness of the naturally-occurring oxide film on the chrome plating, a chrome-plated sample was produced, and the element concentrations along the depth direction thereof were examined by an XPS technique. As shown in FIG. 8, the naturally-occurring chromium oxide film had a thickness which would be equivalent to about 5 minutes of sputtering time.

Figure 9A:
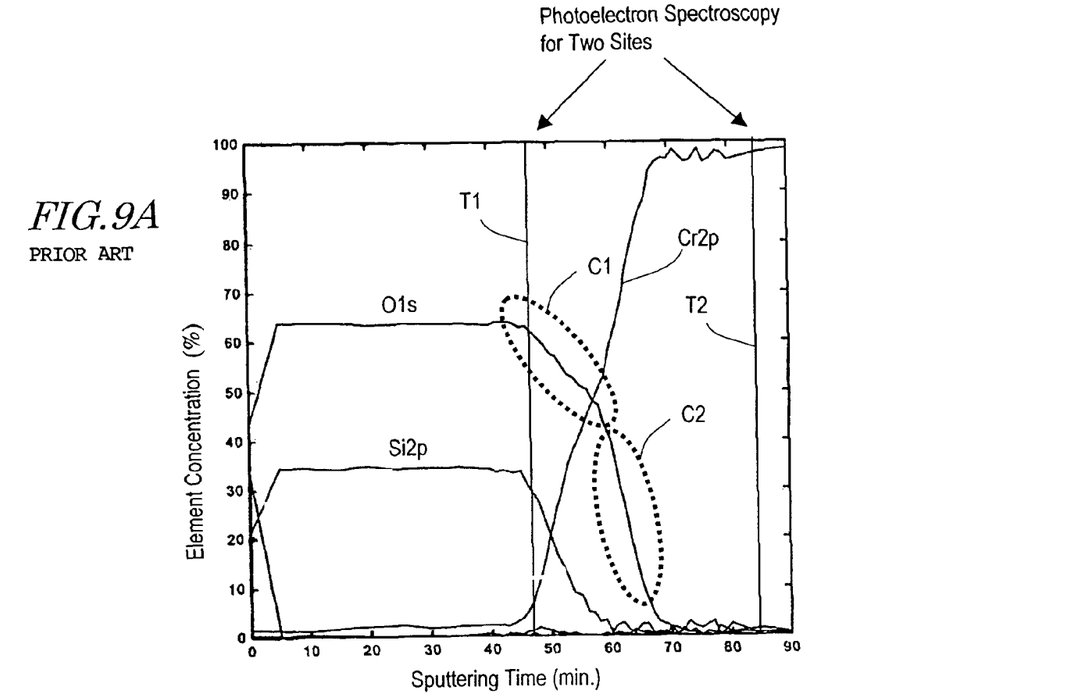
FIGS. 9A and 9B are a graph showing element distributions along the depth direction of a conventional exhaust pipe for an internal combustion engine, where the distribution is obtained through an XPS analysis, and a graph showing the binding energy of chromium taken at two points shown in FIG. 9A.

FIG. 9A shows element distributions along the depth direction of the conventional exhaust pipe as measured by an XPS technique. As is clear from the figure, the oxygen ($O1s$) concentration, which remains constant within the silicon film, decreases in two steps at the interface with the chrome plating, as shown encircled by broken lines C1 and C2. Among these two steps of decrease in oxygen concentration, the decrease (C2) closer to the interface with the chrome plating would be equivalent to about 5 minutes of sputtering time, and therefore is considered to represent the oxygen contained in the naturally-occurring chromium oxide film.

Figure 9B:
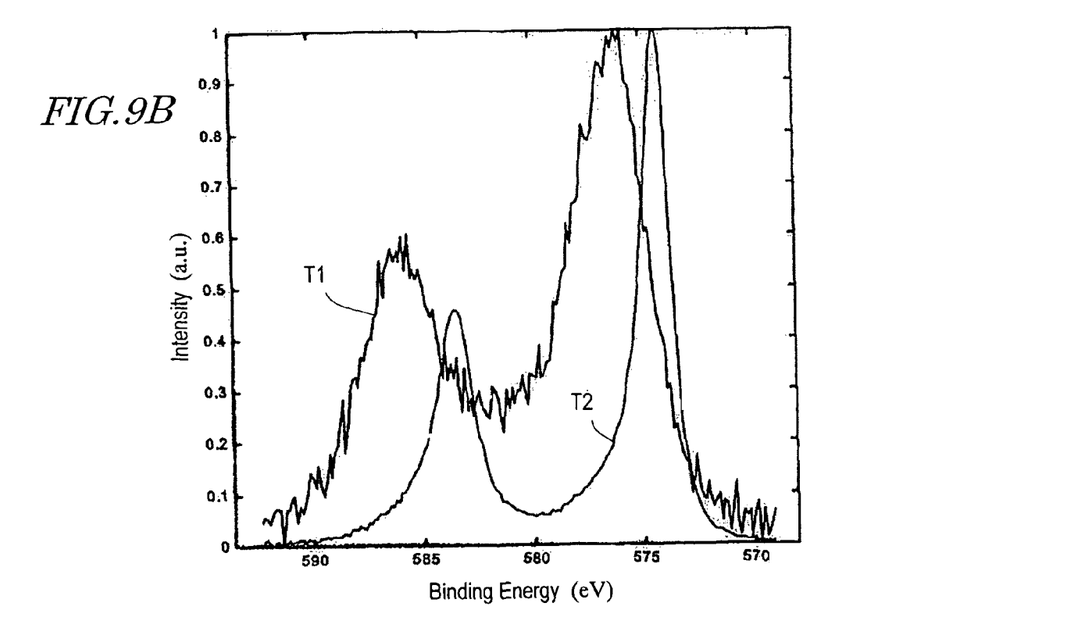

On the other hand, in order to examine the state of chromium in a region where the decrease C1 in oxygen concentration is occurring, the binding energy of 2p valence electrons of chromium at sputtering times T1 and T2 were measured. The measurement results are shown in FIG. 9B. At sputtering time T2, elements other than chromium are substantially absent, and it is therefore presumable that only chromium exists at the depth indicated by sputtering time T2. Therefore, the profile T2 in FIG. 9B represents the binding energy between chromium atoms (metallic bond). On the other hand, the profile T1 is shifted toward the higher energy side, thus indicating chromium in an oxidized state. This chromium oxide is considered to have been generated when forming the silicon oxide film through sol-gel processing.

Thus, it has been shown that, as compared to the conventional exhaust pipe, the exhaust pipe according to a preferred embodiment of the present invention is characterized in that a metal which is dominantly present in the surface of the metal tube is substantially absent from the ceramic film, and that no oxide of the metal substantially composing the surface of the metal tube is present at the interface between the ceramic film and the metal tube.

The above-described conventional example is directed to a silicon oxide film which has been formed through sol-gel processing. Note, however, that any metal oxide film formed by a technique which has conventionally been used for coating an exhaust pipe (e.g., a technique of applying a solution containing a metal compound onto an exhaust pipe surface via application or immersion, followed by a baking) would also show poor denseness as does a silicon oxide film formed through sol-gel processing. For example, in the case where the metal compound solution contains an organic compound, vaporization and decomposition of the organic compound bound to a metal will occur during baking, thus allowing minute voids to be formed and rendering the film porous. Moreover, since such a technique oxidizes (through baking) a metal that is contained in a film which has once been formed, the film denseness is decreased through oxidation, and oxidation will continue to progress during subsequent use.

Next, examples of the exhaust pipe according to a preferred embodiment of the present invention were produced under various conditions, and were subjected to a high temperature heating test. As metal tubes, those composed of SUS304, titanium, or chrome-plated STKM were used. As a ceramic film, either a single-layer film of silicon nitride, silicon oxide, or silicon oxide nitride, or a double-layer film of silicon nitride and silicon oxide was formed. Each exhaust pipe having been produced was left in the atmosphere at about 500° C. for approximately 24 hours, and thereafter the exhaust pipe surface was examined for oxidation and discoloration. The results are shown in Table 1. In the "result" column of Tables 1 and 2 below, ◉ represents "excellent"; ○ represents "good"; and x represents "bad".

TABLE 1

| metal tube | Ceramic film | | | result |
|---|---|---|---|---|
| | film type | thickness | formation method | |
| STKM + chrome plating | silicon nitride | 10 nm | magnetron sputtering technique | ◉ |
| | silicon nitride | 15 nm | | ◉ |
| | silicon nitride | 20 nm | | ◉ |
| | silicon oxide/ silicon nitride | 20 nm/ 10 nm | | ◉ |
| | silicon oxide nitride | 10 nm | | ◉ |
| SUS304 | silicon nitride | 10 nm | magnetron sputtering technique | ◉ |
| | silicon nitride | 20 nm | | ◉ |
| | silicon nitride | 40 nm | | ◉ |
| titanium | silicon oxide/ silicon nitride | 20 nm/ 10 nm | | ◉ |
| | silicon oxide nitride | 10 nm | | ◉ |
| STKM + chrome plating | silicon nitride | 10 nm | ion plating technique | ◉ |
| | silicon nitride | 20 nm | | ◉ |
| SUS304 | silicon nitride | 10 nm | | ◉ |
| | silicon nitride | 20 nm | | ◉ |
| titanium | silicon nitride | 10 nm | | ◉ |
| SUS304 | silicon nitride | 38 nm | magnetron sputtering technique | ◉ |
| | silicon nitride | 50 nm | | ◉ |
| | silicon nitride | 80 nm | | ◉ |
| | silicon nitride | 120 nm | | ◉ |

As shown in Table 1, regardless of whether the underlying layer of the ceramic film was chrome plating, stainless steel, or titanium, each exhaust pipe was free of surface oxidation or discoloration at a high temperature, thus indicating that an excellent exterior appearance will be maintained. Moreover, it can be seen that the oxidation/discoloration prevention function is exhibited regardless of whether the ceramic film is a silicon nitride film, a silicon oxide film, or a silicon oxide nitride film. Furthermore, it is also shown that any such film exhibits its effects in a thickness range from about 10 nm to about 120 nm.

Next, an anti-corrosiveness test was performed for some of the samples shown in Table 1. The test was performed according to JIS-Z2371, and the degree of corrosion was evaluated in terms of RN (Rating Number). RN is a rating from 10 to 0, which represents a degree of corrosion in terms of a ratio between the effective area and the corroded area. The greater the RN value is, the smaller the ratio of corroded area is (i.e., less corrosion). The results are shown in Table 2.

TABLE 2

| metal tube | film type | film thickness | heating | RN | result |
|---|---|---|---|---|---|
| SUS304 | silicon nitride | 20 nm | omitted | 10 | ◉ |
| | silicon nitride | 38 nm | 500° C., 24 h | 10 | ◉ |

TABLE 2-continued

| metal tube | film type | film thickness | heating | RN | result |
|---|---|---|---|---|---|
| | silicon oxide | 40 nm | omitted | 10 | ◎ |
| | silicon oxide | 50 nm | 500° C., 24 h | 10 | ◎ |
| STKM + | silicon nitride | 38 nm | 500° C., 24 h | 9.8 | ◎ |
| chrome | silicon oxide | 40 nm | omitted | 10 | ◎ |
| plating | silicon oxide | 50 nm | 500° C., 24 h | 10 | ◎ |
| | silicon oxide | 100 nm | 500° C., 24 h | 10 | ◎ |
| STKM + | omitted | — | omitted | 9.3 | ○ |
| chrome plating (comparative example) | omitted | — | 500° C., 24 h | 7.0 | X |

As shown in Table 2, according to a preferred embodiment of the present invention, both the heated samples and the unheated samples show excellent anti-corrosiveness, and since the surface is completely protected by a ceramic film, corrosion does not occur. On the other hand, in the comparative examples (in which no ceramic film is formed on the metal tube surface) the chromium formed on the surface can provide a certain degree of corrosion prevention, unless heating is performed. However, once heating is performed, iron is deposited from the underlying STKM, and is oxidized. This is the presumable reason for the low anti-corrosiveness, such that corrosion occurs in a broad area over the surface.

FIG. 10 is a schematic diagram showing an exemplary film thickness distribution in an exhaust pipe which is formed by the above-described method. A percentage value at each arrowhead in FIG. 10 represents a ratio of an actually-obtained thickness to a target value. As is clear from the figure, it is possible to form the ceramic film 10 within fluctuations of about ±30% even if the exhaust pipe has a complicatedly bent three-dimensional shape. Thus, it can be seen that a physical vapor deposition technique is able to form a uniform ceramic film.

Thus, in accordance with an exhaust pipe according to a preferred embodiment of the present invention, by prescribing the thickness of the ceramic film in the aforementioned range, surface oxidation/discoloration at a high temperature is prevented and excellent anti-corrosiveness is provided.

The present invention can be used in a wide variety of applications, including a vehicle having an internal combustion engine (e.g., a motorcycle or an all-climate four-wheel vehicle) and a transportation apparatus having an internal combustion engine (e.g., a ship or an airplane).

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Application No. 2004-206904 filed on Jul. 14, 2004, the entire contents of which are hereby incorporated by reference.

What is claimed is:

1. An exhaust pipe for an internal combustion engine, the exhaust pipe comprising:
a metal tube enclosing a passage through which an exhaust gas from the internal combustion engine passes; and
a ceramic film covering the metal tube only on an outside surface of the metal tube, the ceramic film containing no more than about 0.5 atomic % of a metallic element which is dominantly present in a surface of the metal tube; wherein
the ceramic film is directly disposed on the outside surface of the metal tube; and
the ceramic film has a thickness in a range from about 5 nm to about 30 nm.

2. The exhaust pipe of claim 1, wherein the metal tube has a surface roughness Ra in a range from about 0.4 μm to about 3.2 μm.

3. The exhaust pipe of claim 1, wherein the ceramic film comprises one or more selected from the group consisting of: oxides, nitrides, nitride-oxides, and borides of Si, Ti, Al, Zr, Mo, Nb, W, or V; and $B_4C$.

4. The exhaust pipe of claim 1, wherein the metal tube is composed of titanium, a titanium alloy, or stainless steel.

5. The exhaust pipe of claim 1, wherein the metal tube includes a chrome plating layer formed on a surface thereof.

6. The exhaust pipe of claim 1, wherein substantially no oxide film of the metallic element which is dominantly present in the surface of the metal tube is present between the metal tube and the ceramic film.

7. The exhaust pipe of claim 1, wherein the ceramic film is a vapor-deposited film formed by a vapor deposition technique.

8. The exhaust pipe of claim 7, wherein the ceramic film is a vapor-deposited film formed by a sputtering technique or an ion plating technique.

9. An internal combustion engine device comprising:
an internal combustion engine; and
the exhaust pipe of claim 1, connected to the internal combustion engine.

10. A transportation apparatus comprising the internal combustion engine device of claim 9.

* * * * *